Feb. 1, 1955 W. A. GOSS 2,700,861
MOWER DRIVE SUPPORT MEANS
Original Filed March 26, 1951 3 Sheets-Sheet 1

*INVENTOR.*
WILLIAM A. GOSS
BY
ATTORNEYS

*INVENTOR.*
WILLIAM A. GOSS
BY Whittemore
Hulbert & Belknap
ATTORNEYS

FIG.5.
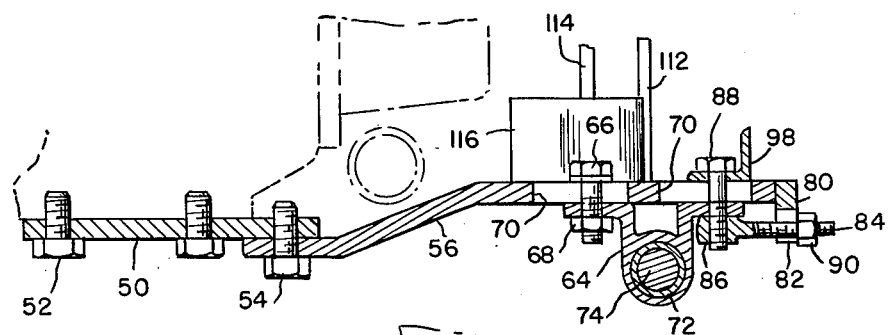
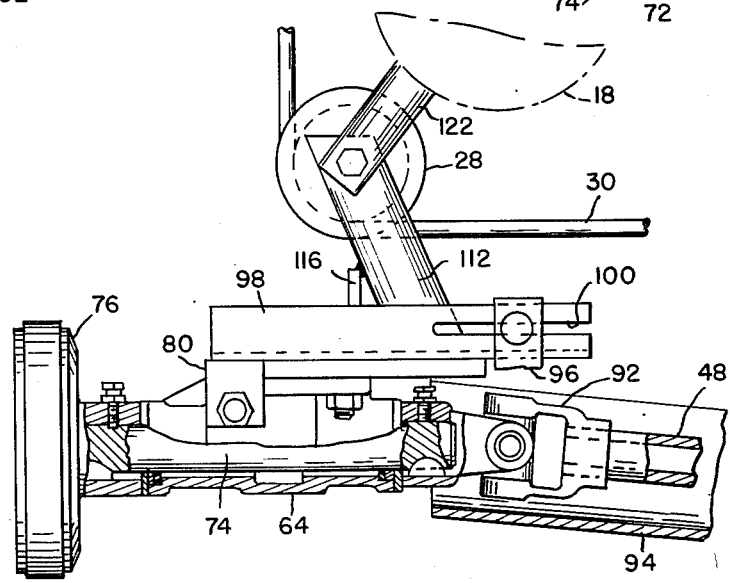
FIG.6.

United States Patent Office 2,700,861
Patented Feb. 1, 1955

2,700,861

MOWER DRIVE SUPPORT MEANS

William A. Goss, Zanesville, Ohio, assignor to Detroit Harvester Company, Detroit, Mich., a corporation of Michigan Original application March 26, 1951, Serial No. 217,451. Divided and this application April 29, 1952, Serial No. 285,016

2 Claims. (Cl. 56—25)

The present invention relates to a tractor-implement which is herein illustrated as comprising a tractor-mower construction.

The present invention is a division of my copending application Serial No. 217,451, filed March 26, 1951.

It is an object of the present invention to provide in combination a tractor having a power take-off shaft and power lift lever, an implement drive shaft, and novel demountable structure supporting the implement drive shaft.

It is a further object of the present invention to provide quick detachable mounting structure for an implement drive shaft.

It is a further object of the present invention to provide detachable mounting structure for an implement drive shaft including means whereby the driving pulley of the implement drive shaft may be engaged with a belt connected to the power take-off pulley of the tractor and thereafter swung into engagement with supporting means permanently secured to the tractor.

Other objects and features of the invention will become apparent as the description proceeds, especially when taken in conjunction with the accompanying drawings, wherein:

Figure 5 is a section on a reduced scale taken on the line 5—5, Figure 3.

Figure 6 is a section on a reduced scale taken on the line 6—6, Figure 3.

Figure 1:
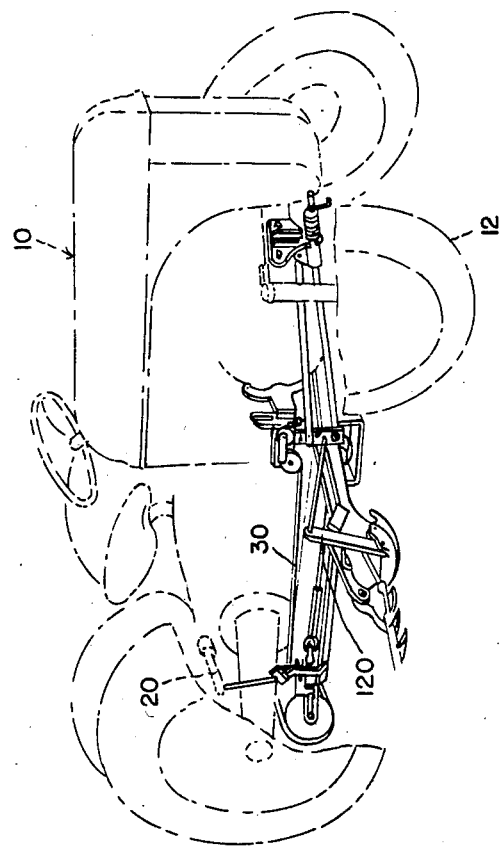
Figure 1 is a perspective view of a tractor-mower combination in which the tractor is shown in broken lines.
Figure 2:
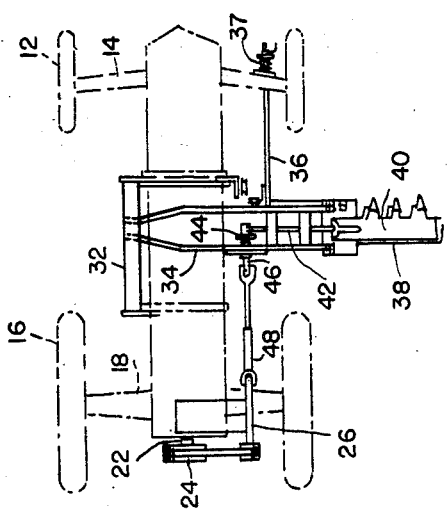
Figure 2 is a plan view of the tractor-mower combination, the tractor again being shown in broken lines.

Referring now to Figures 1 and 2 there is illustrated a tractor 10 having front wheels 12 supported by a front axle 14, rear wheels 16 supported by a rear axle 18, a power lift lever 20, and a power take-off shaft 22 carrying a power take-off driving pulley 24.

The invention relates specifically to mounting means adapted to be secured to the tractor in the vicinity of the power take-off pulley 24, and power lift lever 20 for mounting an implement drive shaft 26 and also for mounting a pulley 28 cooperable with an implement actuating cable 30. Specifically, the implement illustrated herein is a mower but the invention is capable of embodiment in implements of types other than mowers, the illustrations of the mower herein being merely exemplary of an implement requiring actuation by a rotary implement drive shaft and also including means adapted to be adjusted or actuated by a cable.

Specifically, the mower herein comprises a frame part 32 permanently mounted on the tractor, a drag bar 34, and means mounting one end of the drag bar to the frame part 32 for vertical swinging movement, horizontal swinging movement, and angular adjustment about its own longitudinal axis. The drag bar 34 is normally held in operative position by a pull rod 36, a spring 37 being provided to permit limited rearward swinging movement of the drag bar 34 when the mower encounters an obstacle. At its outer end the drag bar 34 is provided with a cutter bar 38 on which is mounted a reciprocable sickle bar 40. The sickle bar is reciprocated by a pitman 42 extending between the sickle 40 and a crank 44 carried by a crank shaft 46. The implement drive shaft 26 is connected to the crank shaft 46 by a telescoping connector shaft 48.

Referring now to Figures 3-6, a fixed support plate 50 is permanently mounted to the underside of the body of the tractor by suitable means such as the bolts 52. The plate 50 is provided with a pair of depending headed fastening elements 54 which serve as means for mounting a removable support plate 56.

In order to provide for quick attachment and detachment of the support plate 56, the plate is provided with a pair of elongated slots 58 terminating at one end in enlargements 60 of a size to pass over the heads of the bolts 54. The elongated slots 58 are relatively narrow and closely engage the shanks of the bolts 54. At the opposite end of the elongated slots 58 from the enlargements 60 they connect with angularly disposed narrow slot portions 62 for a purpose which will subsequently be described.

Carried by the support plate 56 is an implement drive shaft housing 64 adapted to be adjustably secured to the plate 56 by bolts 66 and nuts 68, the bolts extending through elongated slots 70 formed in the plate 56. The shaft housing 64 is provided with bearings 72 and carries the implement drive shaft 74.

Carried by the implement drive shaft 74 is a driven pulley 76 adapted to be connected to the power take-off driving pulley 24 by a flexible driving connection such as a belt 78.

The slot portions 58 and 62 are disposed in a particular way to permit quick mounting of the support plate 56 on the tractor with the belt 78 engaged with the driven pulley 76. For this purpose the slot portions 58 are disposed substantially perpendicular to lines joining the slot portions with a point P on the periphery of the driven pulley 76 diametrically opposite to the driving pulley 24. If desired, the elongated slots 58 could be made arcuate and have their centers of curvature at the point P, but for practical purposes it is sufficient to form straight slot portions 58 angularly disposed as described above. With this arrangement it is possible to mount the plate 56 on the tractor with the belt 78 engaging the pulleys 24 and 76. To accomplish this the driven pulley 76 is engaged in the belt 78 which is held in loosely tensioned relation while the plate 56 is moved upwardly until the heads of the bolts 54 pass through the enlargements 60. Thereafter, the plate is swung to cause the shanks of the bolts to pass along the slot portions 58, after which the bolts 54 may be tightened. It is thus seen that the entire plate assembly may be quickly removed from the tractor by simply loosening the bolts 54, swinging the plate horizontally, and lowering it to the ground. The plate may be assembled by the reverse action, and the assembly provides for proper connection between the pulleys 24 and 76 during the act of assembly.

Figure 3:
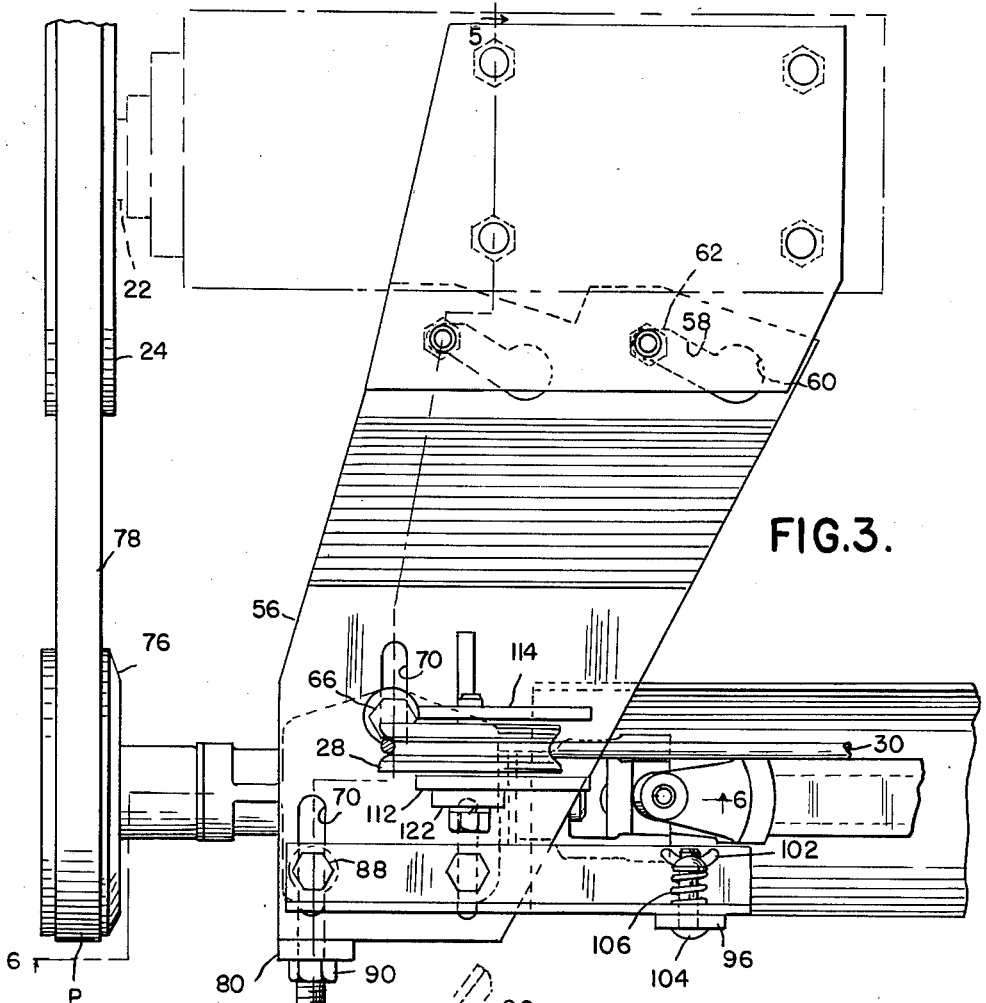
Figure 3 is a fragmentary plan view showing the implement drive shaft and mounting means therefor.
Figure 4:
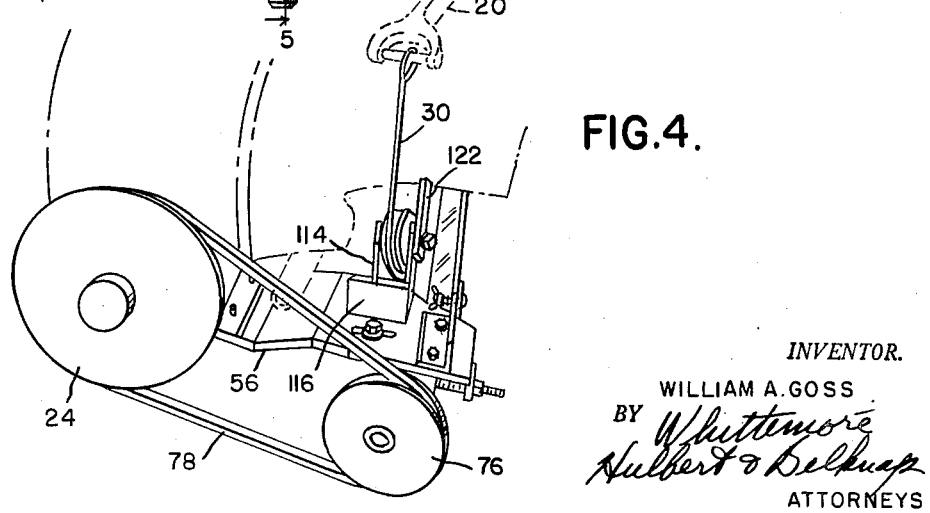
Figure 4 is a perspective view of the implement drive shaft support looking forwardly from the rear of the tractor.

Means are provided for effecting adjustment of the shaft housing 64 toward and away from the power take-off shaft 22 and this means comprises a block 80 welded or otherwise secured to an edge of the plate 56, the block being provided with a vertical slot 82 for the reception of an adjusting eye-bolt 84. The eye-bolt 84 replaces one of the nuts 68, as best seen in Figure 3, and has a threaded eye portion 86 which receives a bolt 88. The eye-bolt 84 carries an adjusting nut 90 and when the nuts 68 are loose on the bolts 66 and the eyebolt 84 is loose on the bolt 88, rotation of the nut 90 will move the shaft housing to the right as seen in Figure 3, thereby effecting a predetermined tensioning of the belt 78.

At its rear end the implement drive shaft 74 is connected by a universal joint 92 to the rear section of the telescoping connector shaft 48.

In order to protect the connector shaft 48 during use of the implement, an elongated guard 94 of generally U-shaped cross-section is provided. The forward end of the guard is secured to a suitable portion of the implement which as described above, is yieldable rearwardly. Accordingly, provision must be made for permitting longitudinal movement of the rear end of the guard 94. This is accomplished by providing a strap 96 on the rear end of the guard 94 and means on the support plate 56 for supporting the upper end of the strap. This means comprises an angle iron 98 having an elongated slot 100 in its forwardly extending end. The strap 96 carries a nut 102, bolt 104, and spring 106 which are assembled together as illustrated in Figure 3, and support the rear end of the guard 94 while permitting sliding movement thereof relative to the support plate 56.

Also mounted on the plate 58 is a sheave or pulley 28 around which the cable 30 is led to connect with the power lift lever 20. The sheave 28 is journalled between a pair of plates 112 and 114 which are welded or otherwise secured to the support plate 56 and are braced by a transversely extending plate 116.

The power lift lever 20 is connected to a tilt arm 120 suitably connected to the cutter bar so that actuation of the power lift lever 20 sequentially elevates the cutter bar 38 and drag bar 34. In order to brace the sheave 28 against the forces developed when the power lift lever 20 is actuated, an abutment member 122 is provided carried by the plate 112 and having its upper end in engagement with the rear axle 18 of the tractor.

Inasmuch as the mower attachment may be demounted from the tractor by disconnecting the coupling between one end of the drag bar and the frame part 32, and by disconnecting the pull rod 36 from the tractor, completion of removal of the entire mower assembly is accomplished simply by loosening the bolts 54 and removing the support plate 56 together with the parts carried thereby.

The structure disclosed herein therefore contributes to the quick demountability of the entire mower attachment and provides for assembly with the tractor in a novel manner which insures proper and simultaneous attachment of the support plate 56 to the tractor and coupling of the driven pulley 76 to the power take-off drive pulley 24 by the bolt 78.

The drawings and the foregoing specification constitute a description of the improved tractor-implement in such full, clear, concise and exact terms as to enable any person skilled in the art to practice the invention, the scope of which is indicated by the appended claims.

What I claim as my invention is:

1. In a mowing machine adapted for rapid attachment and detachment from a tractor having a driving pulley, a support plate, a driven pulley and shaft journalled on said plate, a telescoping coupling shaft connected to said driven shaft, a guard member underlying said coupling shaft, a bracket on said guard member, a guard support on said plate having an elongated slot extending lengthwise of said coupling shaft, means on said bracket slidable in said slot to permit movement of the end of said guard member relative to said plate when said coupling shaft telescopes, a shaft housing for said driven shaft, means mounting said shaft housing on said plate for adjustment toward and away from said driving pulley including elongated slots in said plate, fastening members extending through said last mentioned slots, at least some of said fastening members extending through openings in said guard support to effect simultaneous lateral adjustment of said driven shaft and guard member.

2. In a mowing machine adapted for rapid attachment and detachment from a tractor having a driving pulley, a support plate, a driven pulley and shaft journalled on said plate, a telescoping coupling shaft connected to said driven shaft, a guard member underlying said coupling shaft, a bracket on said guard member, a guard support on said plate having an elongated slot extending lengthwise of said coupling shaft, means on said bracket slidable in said slot to permit movement of the end of said guard member relative to said plate when said coupling shaft telescopes, a shaft housing for said driven shaft, means mounting said shaft housing on said plate for adjustment toward and away from said driving pulley including elongated slots in said plate, fastening members extending through said last mentioned slots, at least some of said fastening members extending through openings in said guard support to effect simultaneous lateral adjustment of said driven shaft and guard member, at least one of said last mentioned fastening members comprising a bolt, an eye-bolt member having an internally threaded eye engaging said bolt and a threaded shank extending therefrom in a direction generally parallel to the elongated slots in said plate, an apertured abutment on said plate through which said shank extends, and an adjusting nut on said shank engageable with said abutment.

References Cited in the file of this patent

UNITED STATES PATENTS

| Number | Name | Date |
|---|---|---|
| 1,930,314 | Healy et al. | Oct. 10, 1933 |
| 2,204,333 | Wagner | June 11, 1940 |
| 2,204,334 | Wagner | June 11, 1940 |
| 2,245,451 | Simpson | June 10, 1941 |
| 2,289,598 | Sladecek | June 14, 1942 |